(12) United States Patent
Czompo

(10) Patent No.: US 9,429,590 B2
(45) Date of Patent: Aug. 30, 2016

(54) ACCELEROMETER AUTOCALIBRATION IN A MOBILE DEVICE

(75) Inventor: Joseph Czompo, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 687 days.

(21) Appl. No.: 13/191,967

(22) Filed: Jul. 27, 2011

(65) Prior Publication Data

US 2013/0025345 A1 Jan. 31, 2013

(51) Int. Cl.
*G01P 21/00* (2006.01)

(52) U.S. Cl.
CPC ...................................... *G01P 21/00* (2013.01)

(58) Field of Classification Search
CPC ........................................................ G01P 21/00
USPC .................................. 73/1.37, 1.38; 702/104
See application file for complete search history.

(56) References Cited

U.S. PATENT DOCUMENTS

| | | | |
|---|---|---|---|
| 5,589,703 A * | 12/1996 | Baskett | 257/419 |
| 7,281,522 B1 * | 10/2007 | Sato et al. | 123/492 |
| 7,450,332 B2 | 11/2008 | Pasolini et al. | |
| 7,640,106 B1 * | 12/2009 | Stokar et al. | 701/507 |
| 7,981,715 B2 * | 7/2011 | Robert | 438/52 |
| 2003/0030814 A1 * | 2/2003 | Osinski et al. | 356/461 |
| 2005/0132805 A1 * | 6/2005 | Park et al. | 73/514.32 |
| 2008/0087085 A1 | 4/2008 | Ueda et al. | |
| 2009/0259424 A1 | 10/2009 | Dutta et al. | |
| 2010/0192662 A1 | 8/2010 | Yanni | |

FOREIGN PATENT DOCUMENTS

| | | |
|---|---|---|
| CN | 102016605 A | 4/2011 |
| DE | 1020040567 A1 | 1/2010 |
| EP | 1788396 A1 | 5/2007 |
| JP | 2002257583 A | 9/2002 |
| JP | 2007010530 A | 1/2007 |
| JP | 2007040763 A | 2/2007 |
| JP | 2007132943 A | 5/2007 |
| JP | 2012070252 A | 4/2012 |

(Continued)

OTHER PUBLICATIONS

Tuck, Kimberly, Implementing Auto-Zero Calibration Technique for Accelerometers, Mar. 2007, Freescale Semiconductors, pp. 1-5.*

(Continued)

*Primary Examiner* — Daniel S Larkin
*Assistant Examiner* — Irving A Campbell
(74) *Attorney, Agent, or Firm* — Muncy, Geissler, Olds & Lowe, P.C.

(57) ABSTRACT

Methods and apparatus for accelerometer autocalibration in a mobile device are provided. In an example, a signal is received from the accelerometer. A substantially constant state of the signal, such as that caused by a freefall of the accelerometer, is detected. When the signal remains in the substantially constant state for at least a predetermined period of time, the signal's noise level is measured. A compensating signal based upon the measured noise level is determined and can be output to the accelerometer, thus compensating the accelerometer to mitigate the noise level. In examples, the compensating signal can be a reference voltage, a reference frequency, and/or a reference pulse train. In a further example, the compensating is performed only when the noise level of the signal is within a range for at least the predetermined period of time.

28 Claims, 3 Drawing Sheets

(56) References Cited

FOREIGN PATENT DOCUMENTS

| WO | 2004041086 A1 | 5/2004 |
|---|---|---|
| WO | 2006016671 A1 | 2/2006 |

OTHER PUBLICATIONS

Clifford, Michelle, Detecting Freefall with Low-G Accelerometers, Nov. 2006, Freescale Semiconductors, pp. 1-8.*
Ko, Vincent, Interfacing Accelerometer MMA73x0I in Mobile Applications, Freescale Semiconductors, pp. 1-18.*
Paul—Non-Patent Literature Mechanical Sciences: Engineering Mechanics and Strength of Materials by Akshay Ranjan Paul, Pijush Roy and Sachayan Mukherjee.*
International Search Report and Written Opinion—PCT/US2012/048047—ISA/EPO—Oct. 31, 2012.
Lai A., et al., "Semi-Automatic Calibration Technique Using Six Inertial Frames of Reference", SPIE Proceedings, The International Society for Optical Engineering—SPIE, Bellingham, Washington, USA, vol. 5274, Jan. 1, 2004, pp. 531-542, XP002993355, ISSN: 0277-786X, DOI : 10.1117/12.530199.
Veltink P.H., et al., "Procedure for in-use calibration of triaxial accelerometers in medical applications", Sensors and Actuators A, Elsevier Sequoia S .A., Lausanne, CH, vol. 68, No. 1-3, Jun. 15, 1998, pp. 221-228, XP004139834, ISSN: 0924-4247, DOI: 10.1016/S0924-4247 (98)00049-1.
Stoev, Julian et al., (Oct. 2006). "Free Fall Detection Algorithms for Hard Disk Drive", International Joint Conference SICE-ICASE, 2006. 2760-2764. doi : 10.1109 / SICE.2006.314703.
Boutelle J., et al., "ICBM re-entry Vehicle Navigation System Development at Honeywell", Position Location and Navigation Symposium, IEEE 1998 Palm Springs, CA, USA Apr. 20-23, 1998, New York, NY, USA, IEEE, US, Apr. 20, 1998, XP010276821, DOI: 10.1109/PLANS. 1998.670094 ISBN: 978-0-7803-4330-6, pp. 294-302.
Curey R K., et al., "Proposed IEEE Inertial Systems Terminology Standard and Other Inertial Sensor Standards", Position Location and Navigation Symposium, 2004. Plans 2004 Monterey, CA, USA Apr. 26-29, 2004, Piscataway, NJ, USA, IEEE, US, Apr. 26, 2004 , XP010768740, DOI: 10.1109/PLANS. 2004.1308978 ISBN: 978-0-7803-8416.3, pp. 83-90.

* cited by examiner

ACCELEROMETER AUTOCALIBRATION IN A MOBILE DEVICE

FIELD OF DISCLOSURE

This disclosure relates generally to electronics, and more specifically, but not exclusively, to apparatus and methods for accelerometer autocalibration in a mobile device.

BACKGROUND

A conventional mobile device often includes an accelerometer that must be calibrated. Accelerometer calibration can be performed during manufacture of the mobile device or during use of the mobile device by an end user.

When calibrating the accelerometer during fabrication of the mobile device, the accelerometer is placed in a test rig, subjected to a known acceleration, and the accelerometer's output signal is measured. This test provides an accurate measurement of an error in the accelerometer's output signal. However, factory calibration traditionally requires expensive specialized hardware and software. The time required to perform the test increases production time, which lowers the rate of production, increases costs, and decreases profits. Thus, it is desirable to eliminate factory calibration of accelerometers in mobile devices.

User calibration of the accelerometer is a classic alternative to factory calibration. In one type of user calibration process, the user intentionally moves the mobile device in a particular complex sequence of movements. This process burdens the user, and can led to incorrect calibration when the user errs while performing the sequence. In another type of conventional mobile device, an autocalibration sequence constantly runs, with hope that the user will perhaps perform the complex sequence of movements that the device requires for autocalibration. This on-going autocalibration process continuously wastes processor time, wastes battery energy, and successful calibration occurs erratically. In addition to these concerns, conventional processes use algorithms that are subject to time-and temperature-induced errors causing accelerometer bias.

Accordingly, there are long-felt industry needs for methods and apparatus that mitigate problems of conventional methods and apparatus, including apparatus and methods for accelerometer autocalibration in a mobile device.

SUMMARY

This summary provides an basic understanding of some aspects of the present teachings. This summary is not exhaustive in detail, and is neither intended to identify all critical features, nor intended to limit the scope of the claims.

Exemplary methods and apparatus for calibrating an accelerometer are provided. In method for calibrating the accelerometer, a signal is received from the accelerometer and a substantially constant state of the signal is detected. When the signal remains in the substantially constant state for at least a predetermined period of time, then a noise level of the signal is measured and the accelerometer is compensated to mitigate the noise level. In an example, the compensating is performed only when the noise level of the signal is within a range for at least the predetermined period of time. The compensation can include determining a compensating signal based upon the measured noise level and outputting the compensating signal to the accelerometer. The compensating signal can be at least one of a reference voltage, a reference frequency, and a reference pulse train. Further, a timer can be started upon detecting the substantially constant state of the signal and the timer used to determine when the signal remains in the substantially constant state for at least the predetermined period of time.

In a further example, provided is a non-transitory computer-readable medium, comprising instructions stored thereon that, when executed by a processor, cause the processor to execute at least a part of the aforementioned method. The non-transitory computer-readable medium can be integrated with a device, selected from the group consisting of a mobile device, music player, video player, entertainment unit, navigation device, communications device, personal digital assistant (PDA), fixed location data unit, and/or a computer.

In another example, provided is an apparatus configured to calibrate an accelerometer. The apparatus includes means for receiving a signal from the accelerometer and means for detecting a substantially constant state of the signal. The apparatus further includes means for measuring a noise level of the signal when the signal remains in the substantially constant state for at least a predetermined period of time and means for compensating the accelerometer to mitigate the noise level when the signal remains in the substantially constant state for at least a predetermined period of time. The apparatus can also include means for performing the compensating only when the noise level of the signal is within a range for at least the predetermined period of time. The means for compensating can include means for determining a compensating signal based upon the measured noise level and means for outputting the compensating signal to the accelerometer. In an example, the compensating signal is at least one of a reference voltage, a reference frequency, and a reference pulse train. The apparatus can further include means for starting a timer upon detecting the substantially constant state of the signal and means for using the timer to determine when the signal remains in the substantially constant state for at least the predetermined period of time.

At least a part of the apparatus can be integrated in a semiconductor die. Further, at least a part of the apparatus can be integrated with a device, selected from the group consisting of a mobile device, music player, video player, entertainment unit, navigation device, communications device, personal digital assistant (PDA), fixed location data unit, and/or a computer. In a further example, provided is a non-transitory computer-readable medium, comprising instructions stored thereon that, when executed by a lithographic device, cause the lithographic device to fabricate at least a part of the apparatus.

In an example, provided is an apparatus configured to calibrate an accelerometer. The apparatus includes a processor configured to receive a signal from the accelerometer and to detect a substantially constant state of the signal. The processor is also configured to measure a noise level of the signal when the signal remains in the substantially constant state for at least a predetermined period of time and to compensate the accelerometer to mitigate the noise level when the signal remains in the substantially constant state for at least a predetermined period of time. The compensating can include determining a compensating signal based upon the measured noise level and outputting the compensating signal to the accelerometer. The compensating signal can include at least one of a reference voltage, a reference frequency, and a reference pulse train. In an example, the compensating is performed by the processor only when the noise level of the signal is within a range for at least the predetermined period of time. The processor can be further configured to start a timer upon detecting the substantially constant state of the signal and to use the timer to determine when the signal remains in the substantially constant state for at least the predetermined period of time.

At least a part of the apparatus can be integrated in a semiconductor die. Further, at least a part of the apparatus can be integrated with a device, selected from the group consisting of a mobile device, music player, video player, entertainment unit, navigation device, communications device, personal digital assistant (PDA), fixed location data unit, and/or a computer. In a further example, provided is a non-transitory computer-readable medium, comprising instructions stored thereon that, when executed by a lithographic device, cause the lithographic device to fabricate at least a part of the apparatus.

The foregoing summary broadly outlines some of the features and technical advantages of the present teachings in order that the detailed description that follows may be better understood. Additional features and advantages are also described. The conception and disclosed embodiments can be readily used as a basis for modifying or designing other structures for carrying out the same purposes of the present teachings. Such equivalent constructions do not depart from the technology of the teachings as set forth in the appended claims. The novel features which are characteristic of the teachings, together with further objects and advantages, are better understood from the detailed description and the accompanying figures. Each of the figures is provided for illustration and description only, and does not define limits of the present teachings.

BRIEF DESCRIPTION OF THE DRAWINGS

The accompanying drawings are presented to describe examples of the present teachings, and are not limiting.

Figure 1:
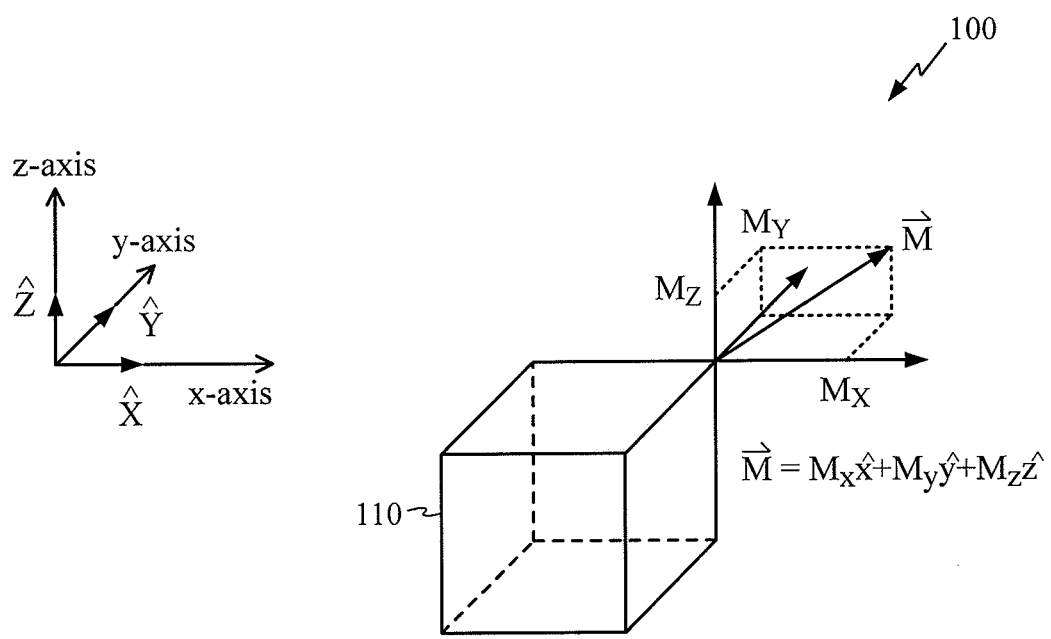
FIG. 1 depicts an exemplary coordinate system for representing linear movement as measured by an accelerometer.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Examples of the current teachings are disclosed in this application's text and related drawings. The examples advantageously address the long-felt industry needs, as well as other previously unidentified needs, and mitigate shortcomings of the conventional methods and apparatus. Alternate embodiments may be devised without departing from the scope of the invention. Additionally, conventional elements of the current teachings may not be described in detail, or may be omitted, to avoid obscuring aspects of the current teachings.

The word "exemplary" is used herein to mean "serving as an example, instance, or illustration." Any embodiment described as "exemplary" is not necessarily to be construed as preferred or advantageous over other embodiments. Likewise, the term "embodiments of the invention" does not require that all embodiments of the invention include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures.

It should be noted that the terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As employed herein two elements can be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

It should be understood that the term "signal" can include any signal such as a data signal, audio signal, video signal, multimedia signal. Information and signals can be represented using any of a variety of different technologies and techniques. For example, data, instructions, commands, information, signals, bits, symbols, and chips that can be referenced throughout this description can be represented by voltages, currents, electromagnetic waves, magnetic fields or particles, optical fields or particles, or any combination thereof.

It should be understood that any reference to an element herein using a designation such as "first," "second," and so forth does not generally limit the quantity or order of those elements. Rather, these designations can be used herein as a convenient method of distinguishing between two or more elements or instances of an element. Thus, a reference to first and second elements does not mean that only two elements can be employed, or that the first element must precede the second element. Also, unless stated otherwise a set of elements can comprise one or more elements. In addition, terminology of the form "at least one of: A, B, or C" used in the description or the claims means "A or B or C or any combination of these elements." Further, the functions, steps and/or actions of the method claims in accordance with the embodiments of the invention described herein need not be performed in any particular order.

The terminology used herein is for the purpose of describing particular embodiments only and is not intended to be limiting of embodiments of the invention. As used herein, the singular forms "a", "an," and "the" are intended to include the plural forms as well, unless the context clearly indicates otherwise. It will be further understood that the terms "comprises," "comprising," "includes," and/or "including", when used herein, specify the presence of stated features, integers, steps, operations, elements, and/or components, but do not preclude the presence or addition of one or more other features, integers, steps, operations, elements, components, and/or groups thereof.

In the following description, certain terminology is used to describe certain features. The term "mobile device" includes, but is not limited to, user equipment, a mobile terminal, a mobile phone, a pager, a global positioning-enabled device, a mobile communication device, a personal digital assistant, a mobile hand-held computer, a wireless device, a person-portable device having an inertial navigation system, and/or other types of mobile devices capable of being carried by individuals and/or having some form of accelerometer-based capability.

Methods and apparatus for accelerometer autocalibration in a mobile device are provided. In an example, an apparatus detects a free-fall state of a mobile device, such as that occurring during running, tossing the mobile device in the air, etc. When the mobile device's accelerometer is subjected to free-fall, accelerometer biases are reflected in the accelerometer's output signal, because during free-fall the accelerometer's output in all axes are zero. A suitable duration of the free-fall state (e.g., <1 second) is determined, and the accelerometer's bias is measured during the duration. Once the accelerometer's bias is known, a compensating signal is adjusted to mitigate the bias.

In another example, a method for calibrating an accelerometer includes receiving a signal indicating acceleration measured by the accelerometer. A substantially constant state of the signal, such as that caused by a freefall of the accelerometer, is detected. When the signal remains in the substantially constant state for at least a predetermined period of time, the signal's noise level is measured. A compensating signal to mitigate the noise level is determined from the measured noise level, and can be output to compensate the accelerometer. In examples, the compensating signal can be a reference voltage, a reference frequency, and/or a reference pulse train. In a further example, the compensating is performed only when the noise level of the signal is within a range.

An advantage provided by the exemplary apparatuses and methods disclosed herein is easier calibration over conventional devices. Other advantages over conventional devices include but are not limited to a reduced calibration time and a lower production cost.

FIG. 1 depicts an exemplary coordinate system 100 for representing linear movement as measured by an accelerometer 110. In general, the accelerometer 110 detects acceleration and generates data (e.g., an accelerometer output signal) indicative of the acceleration along at least one axis. The coordinate system 100 includes a Cartesian coordinate space (x, y, z) for representing linear movement with scalar values, a series of scalar values, and time varying functions ($M_X$, $M_Y$, $M_Z$), as measured by the accelerometer 110. Some accelerometers, such as the accelerometer 110, can provide a magnitude of acceleration, while others provide an indication of acceleration without a magnitude. The accelerometer 110 can measure acceleration causing linear movement along a line (e.g., vector M) with reference to one, two, or three linear directions, such as the Cartesian coordinates x, y, and z. For example, if one-dimensional, the accelerometer 110 provides an output signal indicating linear acceleration along a single axis (e.g., the x-axis). If two-dimensional, the accelerometer 110 provides an output signal indicating linear acceleration in a plane along two axes (e.g., both the x-axis and the y-axis). A two-dimensional accelerometer can comprise two one-dimensional accelerometers. Further, if three-dimensional, the accelerometer 110 provides an output signal indicating linear acceleration in three-dimensional space (e.g., along the x, y, and z-axes). A three-dimensional accelerometer can comprise a two-dimensional accelerometer combined with a one-dimensional accelerometer, or can comprise three one-dimensional accelerometers. Further, acceleration causing linear motion in a direction that is not orthogonal with the coordinate axes (e.g., vector M) can be represented by an accelerometer output signal representing three values in vector form $$\vec{M} = M_x \hat{x} + M_y \hat{y} + M_z \hat{z}$$

where $M_X$, $M_Y$, and $M_Z$ are magnitudes, scalar values, a series of scalar values, and/or time varying functions; and X, Y, and Z are unit vectors with respect to the origin of the Cartesian coordinate system. Alternatively, the accelerometer output signal can be based on a non-orthogonal coordinate system and/or a non-Cartesian coordinate system, such as a coordinate system aligned with a frame of the mobile device.

The accelerometer output signal can include variations (i.e., noise) that are uncorrelated with an acceleration experienced by the accelerometer 110. For example, intrinsic noise, also known as electronic noise, is randomly generated in the accelerometer's electronic circuitry. A detrimental effect of the noise in the accelerometer output signal is that the noise provides accelerometer bias. Accelerometer bias is an indication of acceleration in the absence of an actual acceleration experienced by the accelerometer. In other words, the noise feigns acceleration. The accelerometer bias shifts a calculated acceleration vector (e.g., the vector M) from its actual direction. Thus, when the accelerometer bias is present in an accelerometer-based navigation system, the bias leads to an erroneous determination of position.

Figure 2:
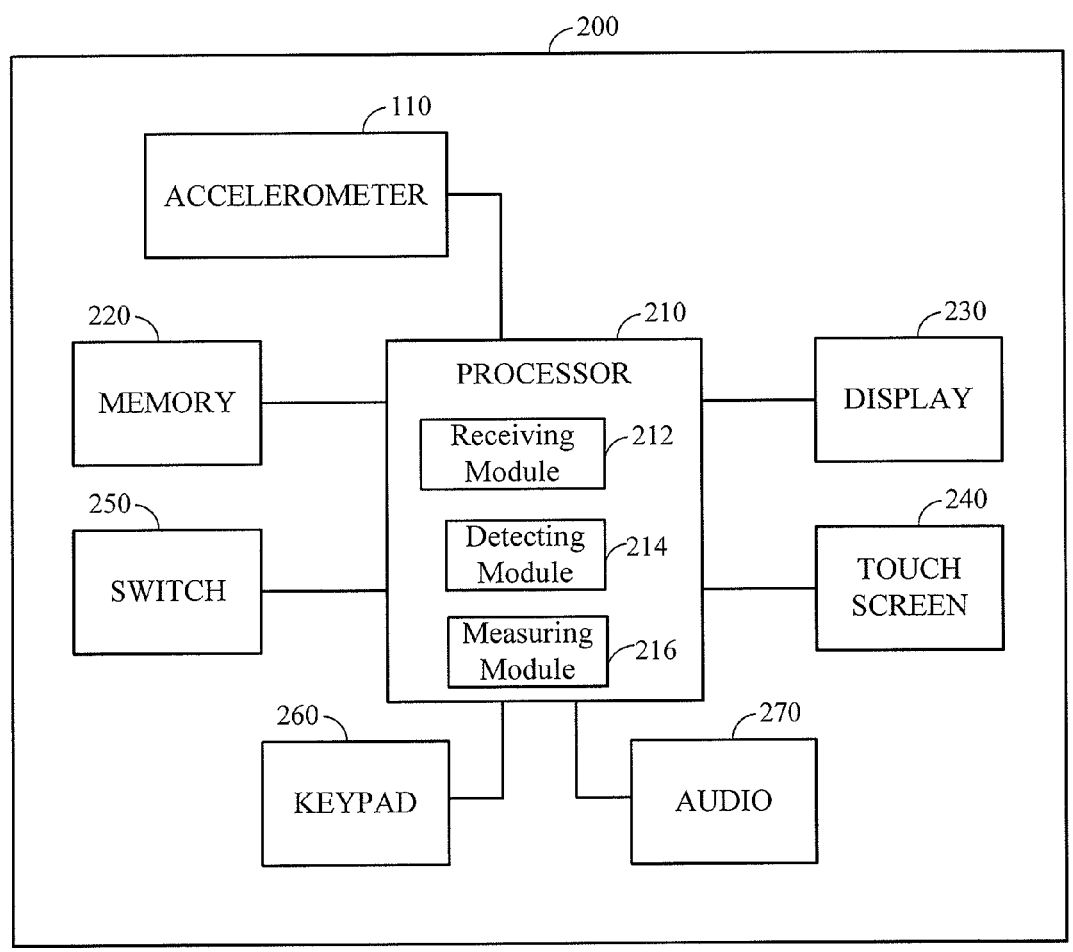
FIG. 2 is an exemplary block diagram of a mobile device.

FIG. 2 is an exemplary block diagram of a mobile device 200 having system-level accelerometer autocalibration. The mobile device 200 can include the accelerometer 110, a processor 210, a memory 220, and a display 230. The accelerometer 110 provides the accelerometer output signal to the processor 210, which provides system-level autocalibration of the accelerometer 110. The mobile device 200 can have a receiving module 212, a detecting module 214, and/or a measuring module 216. The receiving module 212, detecting module 214, and measuring module 216, each may be configured as one or more integrated circuits, program instructions being executed by one or more processors (e.g., processor 210 as illustrated), or by a combination of both. The receiving module 212 performs receiving functions described herein. The detecting module 214 performs detecting functions described herein. The measuring module 216 performs measuring functions as described herein. The mobile device 200 can also include devices and circuitry to accept user input, such as a touch screen 240, a switch 250, a keypad 260, and/or an audio device 270 (e.g., a microphone). Further, the mobile device 200 can include devices and circuitry to provide output data, such as the display 230, and/or the audio device 270 (e.g., a speaker). In examples, at least a portion of the mobile device 200 is integrated on a semiconductor die.

Figure 3:
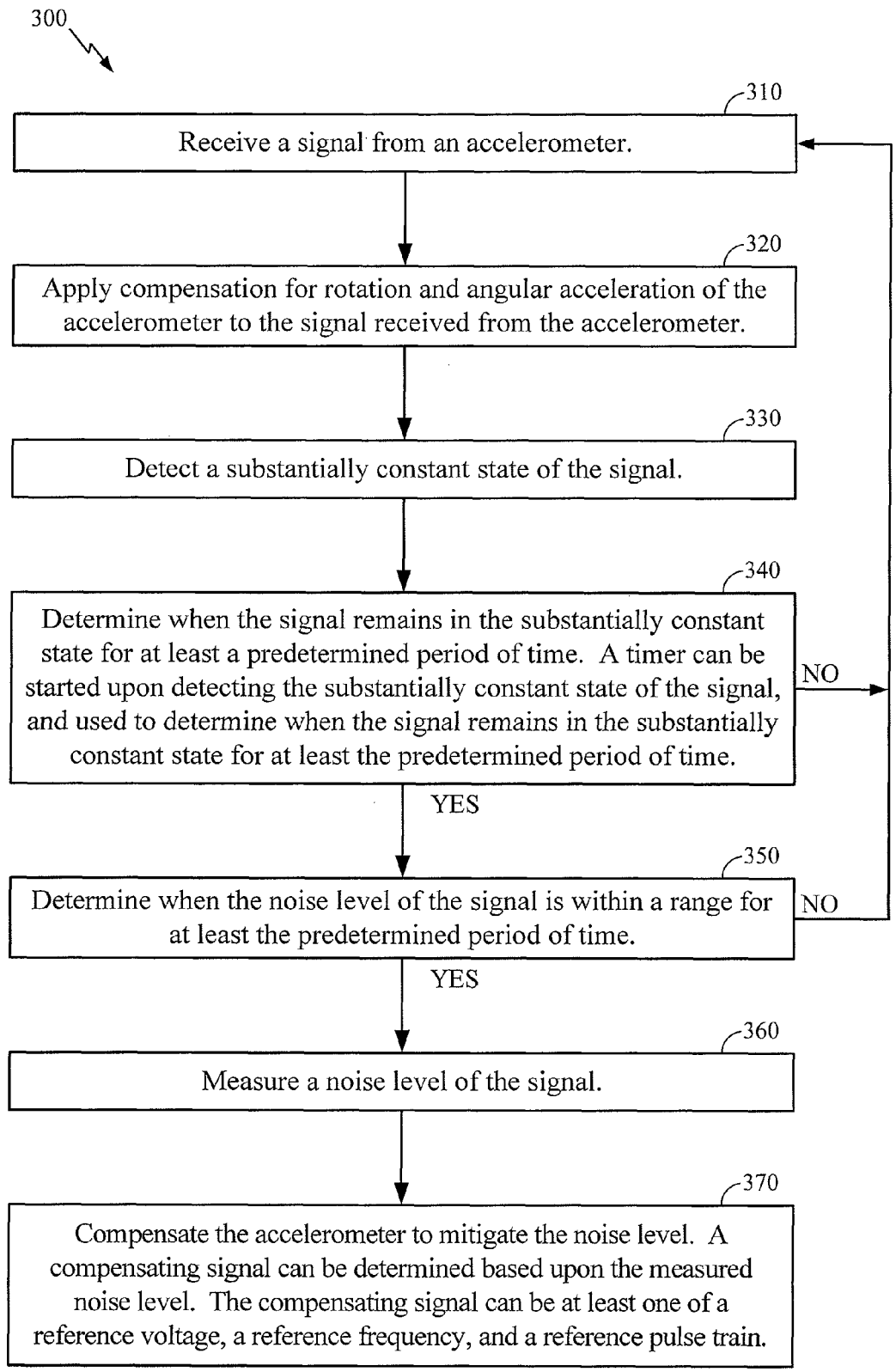
FIG. 3 depicts an exemplary method for calibrating an accelerometer.

FIG. 3 depicts an exemplary method 300 for calibrating an accelerometer in a mobile device. The method 300 for calibrating the accelerometer can be performed by the apparatus described hereby, such as the processor 210 in the mobile device 200. In an example, the processor 210 can initiate at least a part of the method 300 in an absence of user input.

In block 310, a signal is received from the accelerometer. The received signal includes information describing acceleration of the accelerometer, as sensed by the accelerometer.

In block 320, compensation for rotation and angular acceleration of the accelerometer is applied to the signal received from the accelerometer. In an example, a compensation factor $\vec{\alpha}$ is subtracted from the signal received from the accelerometer, where the compensation factor $\vec{\alpha}$ is a lever arm pointing from the center of gravity of the mobile device to the accelerometer, and determined by:

$$\vec{\alpha} = \frac{d\vec{\omega}}{dt} \times \vec{r} + \vec{\omega} \times [\vec{\omega} \times \vec{r}]$$

where $\vec{\omega}$ is a rotation vector, as measured by a three-axis gyroscope, $$\frac{d\vec{\omega}}{dt}$$

is the time derivative of the rotation vector, and $\vec{r}$ is a position vector expressed in a common coordinate system of both the accelerometer and the three-axis gyroscope.

In block 330, a substantially constant state of the signal is detected.

In block 340, when the signal remains in the substantially constant state for at least a predetermined period of time, block 350 is executed. Otherwise, block 310 is performed. Optionally, a timer can be started upon detecting the substantially constant state of the signal, and used to determine when the signal remains in the substantially constant state for at least the predetermined period of time.

In optional block 350, when the noise level of the signal is within a range for at least the predetermined period of time, the method proceeds to block 360. Otherwise, block 310 is executed. When block 350 is omitted, the method proceeds from block 340 directly to block 360.

In block 360, a noise level of the signal is measured.

In block 370, the accelerometer is compensated to mitigate the noise level. A compensating signal can be determined based upon the measured noise level. The compensating signal can be at least one of a reference voltage, a reference frequency, and a reference pulse train.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In some aspects, the teachings herein can be employed in a multiple-access system capable of supporting communication with multiple users by sharing the available system resources (e.g., by specifying one or more of bandwidth, transmit power, coding, interleaving, and so on). For example, the teachings herein can be integrated with devices compatible with any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein can be designed to implement one or more standards, such as IS-95, cdma2000, IS-856, W-CDMA, TDSCDMA, and other standards. A CDMA network can implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein can be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure can be described using 3GPP terminology, it is to be understood that the teachings herein can be applied to 3GPP (e.g., Re199, Re15, Re16, Re17) technology, as well as 3GPP2 (e.g., 1xRTT, 1xEV-DO RelO, RevA, RevB) technology and other technologies. The techniques can be also used in emerging and future networks and interfaces, including Long Term Evolution (LTE)-compatible devices.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

An embodiment of the invention can include a computer readable media embodying a method described herein. Accordingly, the invention is not limited to illustrated examples and any means for performing the functionality described herein are included in embodiments of the invention.

The disclosed devices and methods can be designed and can be configured into GDSII and GERBER computer files, which are stored on a computer readable media. These files are in turn provided to fabrication handlers who fabricate devices, based on these files, with a lithographic device. The resulting products are semiconductor wafers that are then cut into semiconductor die and packaged into a semiconductor chip. The chips are then employed in devices, such as those described herein.

Nothing that has been stated or illustrated is intended to cause a dedication of any component, step, feature, object, benefit, advantage, or equivalent to the public, regardless of whether it is recited in the claims. While this disclosure describes exemplary embodiments of the invention, it should be noted that various changes and modifications could be made herein without departing from the scope of the invention as defined by the appended claims.

What is claimed is:

1. A method for calibrating an accelerometer, comprising:
receiving a signal from the accelerometer;
detecting freefall of the accelerometer from the signal; and
after the accelerometer remains in freefall for at least a predetermined period of time following the detecting freefall:
measuring a noise level of the signal; and
compensating the accelerometer to mitigate the measured noise level.

2. The method of claim 1, wherein the free-fall state of the accelerometer is detected from the signal remaining in a substantially constant state.

3. The method of claim 1, further comprising:
starting a timer upon detecting the freefall of the accelerometer; and
using the timer to determine when the accelerometer remains in freefall for at least the predetermined period of time.

4. The method of claim 1, wherein the compensating comprises:
determining a compensating electrical signal based upon the measured noise level; and
outputting the compensating electrical signal to the accelerometer.

5. The method of claim 4, wherein the compensating electrical signal is at least one of a reference voltage, a reference frequency, or a reference pulse train.

6. The method of claim 1, wherein the compensating is performed only when the noise level of the signal is within a range for at least the predetermined period of time.

7. The method of claim 1, wherein a mobile device includes the accelerometer; and the compensating comprises subtracting a compensation factor $\vec{\alpha}$ from the signal received from the accelerometer, wherein the compensation factor $\vec{\alpha}$ is a lever arm pointing from a center of gravity of the mobile device to the accelerometer, and is determined by:

$$\vec{\alpha} = \frac{d\vec{\omega}}{dt} \times \vec{r} + \vec{\omega} \times [\vec{\omega} \times \vec{r}],$$

wherein $\vec{\omega}$ is a rotation vector, as measured by a three-axis gyroscope, $$\frac{d\vec{\omega}}{dt}$$

is a time derivative of the rotation vector, and $\vec{r}$ is a position vector expressed in a common coordinate system of both the accelerometer and the three-axis gyroscope.

8. The method of claim 1, wherein the predetermined period of time is less than one second.

9. An apparatus configured to calibrate an accelerometer, comprising:
means for receiving a signal from the accelerometer;
means for detecting freefall of the accelerometer from the signal;
means for measuring a noise level of the signal after the accelerometer remains in freefall for at least a predetermined period of time following the detecting freefall; and
means for compensating the accelerometer to mitigate the measured noise level, after the accelerometer remains in freefall for at least the predetermined period of time.

10. The apparatus of claim 9, wherein the free-fall state of the accelerometer is detected from the signal remaining in a substantially constant state.

11. The apparatus of claim 9, further comprising:
means for starting a timer upon detecting the freefall of the accelerometer; and
means for using the timer to determine when the accelerometer remains in freefall for at least the predetermined period of time.

12. The apparatus of claim 9, wherein the means for compensating comprises:
means for determining a compensating electrical signal based upon the measured noise level; and
means for outputting the compensating electrical signal to the accelerometer.

13. The apparatus of claim 12, wherein the compensating electrical signal is at least one of a reference voltage, a reference frequency, or a reference pulse train.

14. The apparatus of claim 9, further comprising a semiconductor die, wherein the means for compensating is integrated on the semiconductor die.

15. The apparatus of claim 9, further comprising a mobile device, wherein the means for compensating is integrated with the mobile device.

16. An apparatus configured to calibrate an accelerometer, comprising a processor configured to:
receive a signal from the accelerometer;
detect freefall of the accelerometer from the signal;
measure a noise level of the signal after the accelerometer remains in freefall for at least a predetermined period of time following the detecting freefall; and
compensate the accelerometer to mitigate the measured noise level after the accelerometer remains in freefall for at least the predetermined period of time.

17. The apparatus of claim 16, wherein the freefall of the accelerometer is detected from the signal remaining in a substantially constant state.

18. The apparatus of claim 16, wherein the processor is further configured to:
  start a timer upon detecting the freefall of the accelerometer; and
  use the timer to determine when the accelerometer remains in freefall for at least the predetermined period of time.

19. The apparatus of claim 16, wherein the compensating comprises:
  determining a compensating electrical signal based upon the measured noise level; and
  outputting the compensating electrical signal to the accelerometer.

20. The apparatus of claim 19, wherein the compensating electrical signal is at least one of a reference voltage, a reference frequency, or a reference pulse train.

21. The apparatus of claim 16, further comprising a semiconductor die, wherein the processor is integrated on the semiconductor die.

22. The apparatus of claim 16, further comprising a mobile device, wherein the processor is integrated with the mobile device.

23. A non-transitory computer-readable medium, comprising instructions stored thereon that, when executed by a processor, cause the processor to execute a method comprising:
  receiving a signal from an accelerometer;
  detecting freefall of the accelerometer from the signal; and
  after the accelerometer remains in freefall for at least a predetermined period of time following the detecting freefall:
    measuring a noise level of the signal; and
    compensating the accelerometer to mitigate the noise level.

24. The non-transitory computer-readable medium of claim 23, wherein the method further comprises:
  detecting the freefall of the accelerometer from the signal remaining in a substantially constant state.

25. The non-transitory computer-readable medium of claim 23, wherein the method further comprises:
  starting a timer upon detecting the freefall of the accelerometer; and
  using the timer to determine when the accelerometer remains in freefall for at least the predetermined period of time.

26. The non-transitory computer-readable medium of claim 23, wherein the compensating comprises:
  determining a compensating electrical signal based upon the measured noise level; and
  outputting the compensating electrical signal to the accelerometer.

27. The non-transitory computer-readable medium of claim 26, wherein the compensating electrical signal is at least one of a reference voltage, a reference frequency, or a reference pulse train.

28. The non-transitory computer-readable medium of claim 23, wherein the non-transitory computer-readable medium is integrated with a mobile device.

* * * * *